3,319,297
INJECTION MOLDING MACHINE
Graydon S. Garvin, La Canada, Calif., and Donald G. Kuharik, Cleveland, Ohio, assignors to The B. F. Goodrich Company, New York, N.Y., a corporation of New York
Filed July 17, 1964, Ser. No. 383,302
9 Claims. (Cl. 18—30)

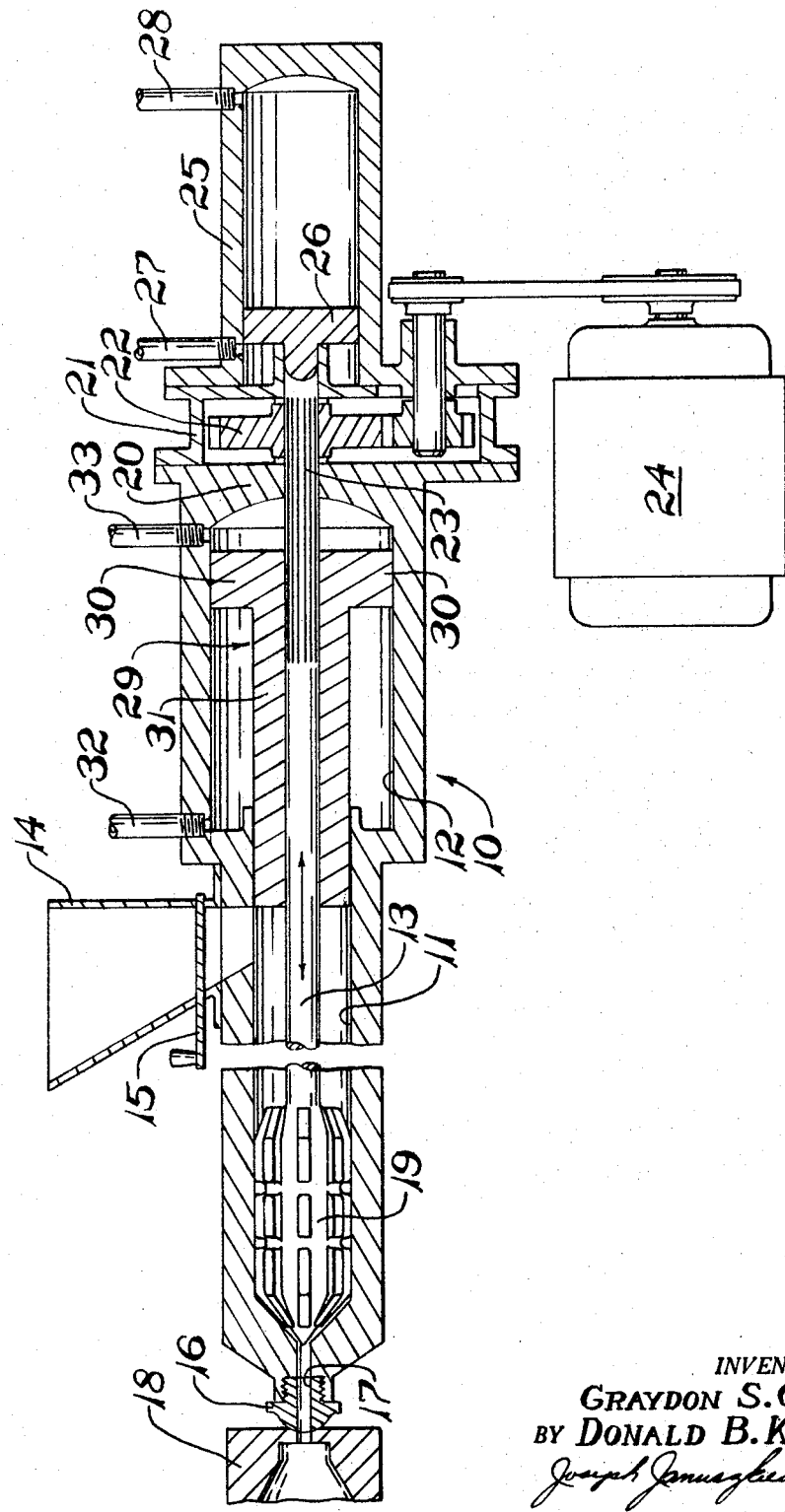

This invention relates to ram injection molding and more particularly to a new and improved apparatus for molding plastic materials.

Heretofore, plasticizing and extruding machines, having rotating screws, have been used to condition plastic materials such as rubber for compacting such rubber for further forming by delivery of the worked material to forming rolls for further working. Further application of such machines has been to plasticize powdered granular flaked thermoplastic materials and extrude such materials from an opening downstream of the barrel. In such process, it is essential to heat the material being processed to condition such material for extrusion. Such heating can be done either externally or by working such materials during their axial movement within the barrel prior to extrusion. In the latter process it is necessary to control the mastication to prevent overheating which would otherwise cause rapid degradation. It has been proposed to obtain a better heat transfer to the material being worked to use a rotating spreader or torpedo in cooperation with an axially movable ram as in injection molding of the type shown in United States Patent 3,045,283. Such ram injection molding machines (of the type shown in U.S. Patent 3,045,283) provides a positive mechanical working of a given charge of plastic material. This type of integrated molding machine is vastly more complex than an ordinary ram molding machine and provides additional problems in heat control with corresponding problems in thermal decomposition. Such injection molding machines have proven to be very valuable, particularly in the injection molding of heat sensitive materials wherein the length of time involved in plasticizing and working such materials is extremely short and it is necessary to reduce the effluence or purging from the mixing chamber. A problem encountered in such ram injection molding machines is that it is not commercially practical to always construct molds that will accept the exact volume of material prepared by such rotating spreaders. Such problem arises where the mold accepts less than the full charge prepared. As an example of this, where the mold accepts only two-thirds of the charge mixed, one-third remains in the torpedo mixing zone at a relative high temperature since such portion has been worked. Thereafter, on the next charge where additional thermoplastic material is admixed with that portion remaining in the torpedo mixing zone, the one-third portion that is in the mixing zone is remixed (reheated) thereby remaining at the high temperature for a prolonged period of time presenting the problem of possible thermal decomposition. This is particularly emphasized where thermal sensitive material is processed.

The present invention provides a rotating spreader or torpedo that is cooperative with a ram injector to prepare the exact volume of plastic material to the proper temperature, wherein such volume prepared is equal in volume to the volume used in the mold rather than the full shot, so that there is not left in the injection chamber any plastic material which has a temperature close to its molding and thermal decomposition temperature as in prior apparatus of this nature. Such apparatus as of the instant invention permits greater flexibility in switching to molds of different sizes with substantially continuous uninterrupted ram injection molding. Such apparatus reduces the time lag that is so critical in the processing of heat sensitive materials. In addition, with the instant invention, the heterogeneity of the melt produced by the rotating spreader device is more strain-free than parts made on conventional ram injection presses due to the thorough mixing by the spreader prior to actuation of the ram.

The present invention comprises a barrel, housing a rotating and reciprocable spreader whose rotational speed and reciprocable movement can be adjusted. Such spreader is cooperative with a ram located upstream of the spreader such that the ram can effect flow of the mixed thermoplastic material to the extent desired after conditioning of the plastic material by the spreader. Such invention encompasses the method of molding plastic material by initially filling an injection chamber with a plastic material, working such material to a predetermined condition of temperature and viscosity, and thence moving such conditioned portion of plastic material out of the injection chamber.

It is an object of this invention to provide a more efficient injection molding machine for heat sensitive materials.

It is a further object of this invention to provide a more efficient device which assures controlled working of plastic materials prior to ram injection from the injection chamber.

A further object of this invention is to provide a full working of a variable controlled volume.

A further object of this invention is to maintain uniformity of temperature and mix of a melt to be purged from an injection molding machine.

Still a further object of this invention is to uniformly control the temperature and viscosity of the melt prior to purging.

Another object of this invention is to provide a complete purging of the conditioned melt.

A further object of this invention is to reduce the time during which the melt is maintained at its upper limits of temperature to prevent decomposition of any portion of the melt.

Another of the objects is to provide a new and improved ram injection method for processing plastic materials.

These and other objects achieved by this invention will become more apparent as this description proceeds in connection with the accompanying drawing.

FIG. 1 is a schematic cross-sectional elevational view of a simplified ram injection molding machine.

FIG. 1 discloses in general outline a schematic showing of a ram injection machine as modified according to this invention. A barrel or tubular casing 10 having a longitudinally extending bore 11 coaxial with another larger bore 12 houses a movable rod 13.

Casing 10 has a feed hopper 14 connected to the intermediate portion thereof, which hopper 14 retains a supply of unplasticated material for introduction into the bore 11 past a sliding control plate 15. Suitably attached to the forward portion of casing 10 is a nozzle 16, which nozzle 16 has one end of a passageway 17 communicating with the bore 11 and the other end of passageway 17 communicating with the interior of a mold 18. Means, conventional in the art, are provided to allow timed opening and closing of the mold to permit the flow control of the plasticized material into the cavity of the mold 18. Mounted for reciprocable and rotational movement within the forward portion of bore 11 of casing 10 is a spreader or torpedo 19, which spreader 19 is attached to one end of rod 13. Rod 13 extends through an end wall 20 on the rearward portion of casing 10 into the interior of a housing 21. The other end of rod 13 is connected to a spur gear 22 in housing 21 via a splined connection 23. Spur gear 22 is driven through suitable gearing and transmission means from a motor 24. A hydraulic cylinder 25 is attached to the housing 21. Hydraulic cylinder 25 closely receives for reciprocation therein a piston 26, which piston 26 is connected to rod 13. Controlled reciprocation is effected on rod 13 by supplying variable fluid pressure to the rod end or head end of hydraulic cylinder 25 via conduits 27 and 28 respectively.

A tubular ram 29 encompassing rod 13 has its tubular piston 30 closely slidably received by bore 12 and its tubular rod 31 closely received by bore 11. The respective end portions of bore 12 are connected via conduits 32 and 33 to a suitable fluid-pressure supply source to provide controlled reciprocation of ram 29. Ram 29 forces the plasticized material downstream by virtue of the fluid-pressure exerted by piston 30 when fluid-pressure is introduced into the rearward most end portion of bore 12 via conduit 33. Obviously, suitable seals and bearing units are provided to prevent leakage of the hydraulic fluid and plasticized materials as well as provide suitable support for the parts.

In operation of the rotating torpedo ram machine, plastic materials such as thermoplastic resin is fed from the feed hopper 14 past control plate 15 into bore 11 of casing 10, filling such bore 11. The spreader 19 is rotated via its splined connection to gear 22, and is reciprocated by its connection to the double-acting cylinder 25 through controlled pressurization of the head end of cylinder 25. The length of stroke of the spreader 19 is governed by the quantity of material prepared for injection as distinguished from the entire amount of thermoplastic material in the full length of bore 11. Such stroke is controlled by the piston 26 in hydraulic cylinder 25. In addition to such controlled stroke, the frequency of the stroke may be controlled by the hydraulic cylinder 25 to condition the required quantity of plastic material to the desired temperature and viscosity. The spreader 19 is then positioned to its forward most position as shown in FIG. 1. The nozzle 16 is opened to communicate the cavity of mold 18 with bore 11 via passageway 17. The injection ram 29 is moved forwardly (to the left as viewed in FIG. 1), moving the fluxed material through the nozzle 16. The ram 29 is then returned to its withdrawn position and an additional quantity of plastic material is transferred via feed hopper 14 to the bore 11 preparatory to the next cycle of operation. It will be noted that the complete quantity of fluxed material surrounding the spreader is ejected such that the material surrounding the spreader at the completion of the ejection is below the conditioned fluxed material in temperature and viscosity. Thus there is left in the cylinder no plastic material which has a temperature close to its molding and thermal decomposition temperature. This is in contra-distinction to those ram injection molding machines which employ the rotating spreader to bring the plastic material to the upper limits of temperature during the injection process since such process leaves plastic materials in the barrel of the injection molding machine which has a temperature close to thermal decomposition which seriously interferes with further processing of heat sensitive materials.

Another method of operation is to initially fill the bore 11 from the hopper 14 as described above. The spreader 19 is rotated and slowly retracted (moved to the right as viewed in FIG. 1) to the rear, pushing the fluxed material to the front of the spreader. When the desired volume of material is moved to the front of the spreader 19 which is equal to the volume of mold, either one of two operations is possible. First, communication is established between mold 18 and bore 11, then the spreader 19 is thrust forward via its connection to hydraulic cylinder 25 to thereby move the plasticized material through the nozzle 16 into the mold 18. Material could again be fed from the feed hopper 14 to the bore 11 for the next cycle. The second operation would return the spreader 19 to the forward portion of the casing 10, to the position as shown in FIG. 1, after such plasticizing of the materials. The nozzle 16 is then opened to establish communication between the cavity of mold 18 with the bore 11 via passageway 17. The injection ram 29 is moved forwardly to move the fluxed material through the nozzle 16. The ram 29 is then returned to its withdrawn position and an additional quantity of plastic material is fed into the bore 11 via hopper 14.

Obviously many modifications and variations of the present invention are possible in the light of the above teachings. It is therefore to be understood, that within the scope of the appended claims, the invention may be practiced otherwise than as specifically described.

We claim:

1. In an injection molding machine comprising a barrel having a downstream portion and an upstream portion, means for feeding a thermoplastic resin into said upstream portion, said downstream portion having a discharge opening, a spreader mounted in said barrel for reciprocable movement therein, means operatively connected to said spreader for selectively rotating said spreader at predetermined speeds, power operated means connected to said spreader for reciprocating said spreader in said barrel to condition such thermoplastic resin, the forward portion of said spreader being grooved and thereby cooperative with said discharge opening to maintain open communication therebetween, a ram axially aligned in said barrel and operative therein for advancing said resin from said upstream portion to said downstream portion past said spreader and through said opening, and means for actuating said ram.

2. In an injection molding machine comprising, a barrel having an upstream portion and a downstream portion, means for feeding a thermoplastic resin into said upstream portion of said barrel, means for discharging resin from said downstream end of said barrel, a spreader mounted in said barrel, a shaft having one end operatively connected to said spreader, said shaft having its other end portion splined, said other end of said shaft being connected to means for reciprocating said spreader a substantial distance within said barrel between predetermined limits, means operatively connected to said splined end portion of said shaft for rotating said shaft at predetermined speeds, an injection ram reciprocably mounted in said barrel for reciprocable movement therein, and means operatively connected to said ram for reciprocating said ram to advance resin from said upstream portion past said spreader and through said discharge means.

3. In an injection molding machine comprising, a barrel having an upstream portion and a downstream portion, hopper means for feeding a plastic resin into said upstream portion of said barrel, an opening in said downstream end of said barrel, a spreader mounted in said barrel, a shaft having one end operatively connected to said spreader, said shaft having its other end splined and connected to means for reciprocating said spreader between selective limits at selective frequencies, means operatively connected to said splined end of said shaft for rotating said shaft at selective predetermined speeds, a tubular ram reciprocably mounted in said barrel on the intermediate portion of said shaft, and means operatively connected to said ram for reciprocating said ram to advance resin from said upstream portion past said spreader and through said opening.

4. In an injection molding machine comprising, a barrel having an upstream portion and a downstream portion, means for feeding a thermoplastic resin into said upstream portion of said barrel, an injection cylinder mounted on one end of said barrel, said cylinder having a piston operatively connected to a ram reciprocably movable in said upstream portion, an opening in said other end of said barrel wherein said other end lies in said downstream end portion of said barrel for discharging resin therefrom, a spreader mounted in said barrel for reciprocable movement therein, a shaft having one end operatively connected to said spreader, said shaft extending through said ram in coaxial alignment therewith and movable relative thereto, said shaft having its other end splined and connected to means for reciprocating said spreader a substantial distance between predetermined limits to effect a working of the thermoplastic resin, said spreader having flights over the length thereof, the forward portion of said spreader flights cooperative with the forward portion of said barrel to maintain open communication between said discharge opening and said barrel irrespective of the position of said spreader on said barrel, means operatively connected to said splined end of said shaft for rotating said shaft at predetermined speeds, means for actuating said piston and said ram for moving said ram linearly relative to said shaft and relative to said spreader to advance resin from said upstream portion to said downstream portion past said spreader and through said opening.

5. In a ram-injection molding machine comprising a barrel having an upstream portion and a downstream portion, hopper means for feeding a plastic resin material into said upstream portion of said barrel, discharge means on said downstream end of said barrel, a torpedo mounted in said barrel, a shaft having one end operatively connected to said torpedo, said shaft having its other end splined and connected to means for rotating said torpedo at selective speeds, means operatively connected to said splined end of said shaft for linearly reciprocating said shaft at selective frequencies to mix resin material in said barrel and move said mixed resin toward said discharge means; and means operatively connected to said discharge means for opening said discharge means to facilitate the discharge of fluxed resin material from said barrel in cooperation with the linear movement of said torpedo towards the discharge means.

6. In an injection molding machine comprising, a barrel having an upstream portion and a downstream portion, means for feeding a thermoplastic resin into said upstream portion of said barrel, discharge means in said downstream portion of said barrel for discharging resin therefrom, means operatively connected to said discharge means for controlling the opening and closing of said discharge means, a spreader mounted in said barrel, said spreader having flights thereon to maintain open communication between said barrel and said discharge means, a shaft having one end operatively connected to said spreader, said shaft having its other end splined and connected to a hydraulic cylinder and piston, means operatively connected to said splined end of said shaft for rotating said shaft at predetermined speeds, a ram mounted in said barrel and adjustable therein, means operatively connected to said ram to adjust the position therein relative to said spreader to vary the chamber defined therebetween, and means operatively connected to said cylinder for actuating said piston to effect predetermined reciprocable movement of said spreader for working such resin and advancing such resin through said discharge means upon controlled opening thereof.

7. An injection molding machine comprising a barrel; said barrel having an opening at one end thereof for receiving a thermoplastic resin therein; said barrel having a bore at the other end thereof for connection to a die to control discharge of thermoplastic resin therefrom; a spreader mounted in said other end of said barrel, adjustable means mounted in said one end cooperative with said barrel to define an adjustable variable volume injection chamber therein; and other means operatively connected to said spreader for rotating and reciprocating said spreader in said barrel to provide a working of thermoplastic resin therein and for discharging thermoplastic resin through said bore; and means for selectively opening and closing said bore to facilitate the working of thermoplastic resin therein and the discharge of resin therefrom.

8. An injection molding machine comprising a barrel, said barrel having an opening at one end thereof for receiving a thermoplastic resin therein, said barrel having a bore at the end for discharging of thermoplastic resin therefrom, a spreader mounted in said other end of said barrel, means operatively connected to said spreader for rotating and reciprocating said spreader a substantial distance in said barrel for working thermoplastic resin therein, and means linearly movable in said one end of said barrel for discharging worked thermoplastic resin through said bore.

9. An injection molding apparatus comprising a housing having an injection chamber, said housing having means for feeding a thermoplastic material into one end portion of said chamber, discharge opening means at the other end portion of said chamber, a spreader mounted in said chamber and closely received thereby for reciprocable movement therein, means operatively connected to said spreader for rotating and reciprocating said speaker back and forth within selective adjustable limits in said chamber, said last mentioned means being adjustable in frequency of stroke, and an injection ram movably mounted in said one end portion of said chamber cooperable with said spreader in said other end portion of said chamber for moving fluxed thermoplastic material from said discharge opening means.

References Cited by the Examiner

UNITED STATES PATENTS

| | | | |
|---|---|---|---|
| 2,903,747 | 9/1959 | Wucker | 18—30 |
| 3,045,283 | 7/1962 | Keiser | 18—30 |
| 3,109,198 | 11/1963 | Guignard | 18—30 |

FOREIGN PATENTS

| | | |
|---|---|---|
| 383,826 | 4/1963 | Japan. |
| 1,003,948 | 3/1957 | Germany. |
| 1,095,515 | 12/1960 | Germany. |

J. SPENCER OVERHOLSER, *Primary Examiner.*

W. L. McBAY, *Assistant Examiner.*